United States Patent [19]

Haskell

[11] Patent Number: 4,535,352
[45] Date of Patent: Aug. 13, 1985

[54] TECHNIQUE FOR GENERATING SEMI-COMPATIBLE HIGH DEFINITION TELEVISION SIGNALS FOR TRANSMISSION OVER TWO CABLE TV CHANNELS

[75] Inventor: Barin G. Haskell, Tinton Falls, N.J.

[73] Assignee: AT&T Bell Laboratories, Murray Hill, N.J.

[21] Appl. No.: 600,805

[22] Filed: Apr. 16, 1984

[51] Int. Cl.³ .................. H04N 9/38; H04N 9/39; H04N 9/42; H04N 9/32
[52] U.S. Cl. ................................. 358/16; 358/11; 358/12
[58] Field of Search .................... 358/11, 16, 12

[56] References Cited

U.S. PATENT DOCUMENTS

| | | | |
|---|---|---|---|
| 2,686,831 | 8/1954 | Dome | 178/6.8 |
| 3,617,626 | 11/1971 | Bluth et al. | 178/6.6 A |
| 4,296,431 | 10/1981 | Holland | 358/12 |
| 4,300,161 | 11/1981 | Haskell | 358/142 |
| 4,429,327 | 1/1984 | Oakley et al. | 358/12 |
| 4,473,837 | 9/1984 | Tiemann | 358/12 |
| 4,476,484 | 10/1984 | Haskell | 358/11 |

OTHER PUBLICATIONS

Karen Berney, "CBS Bares Scheme for 1,050 Line TV", *Electronics*, Oct. 6, 1983, pp. 52, 54.
Kerns H. Powers, "Compatibility Aspects of HDTV", *High Definition Television Colloquium, Ottawa, Canada*, Oct. 18–21, 1982, pp. 1.6-1–1.6-17.
*IEEE Trans. on Broadcasting*, vol. BC-24(4), Dec., 1978, "A Study of . . . ", by T. Fujio, pp. 92–100.
*IEEE Trans. on Broadcasting*, vol. BC-25(4), Dec., 1979, "Present Situation of . . . ", by T. Ishida et al, pp. 105–112.
*SMPTE Journal*, vol. 89(2), Feb., 1980, "The Future of High-Definition . . . ", by D. G. Fink, pp. 89–94.
*SMPTE Journal*, vol. 89(3), Mar., 1980, "The Future of High-Definition . . . ", by D. G. Fink, pp. 153–161.
*IEEE Trans. on Broadcasting*, vol. BC-26(2), Jun., 1980, "A Universal Weighted . . . ", by T. Fujio, pp. 39–47.
Electronic Letters, vol. 16(14), Jul. 3, 1980, "Fibre Optic Analogue . . . ", by K. Asatani et al, pp. 536–538.
*SMPTE Journal*, vol. 89(8), Aug., 1980, "High Definition Television . . . ", by T. Fujio et al, pp. 579–584.
*IBC 80*, Brighton, U. K., Sep. 20–23, 1980, "High Definition Television . . . ", by T. Fujio et al, pp. 14–18.
*NTG-Fachber*, vol. 74, Sep. 30–Oct. 3, 1980, "Concepts for a Compatible . . . ", by B. Wendland, pp. 407–416.
*IEEE Trans. on Broadcasting*, vol. BC-26(4), Dec., 1980, "High-Definition Wide-Screen . . . ", by T. Fujio, pp. 113–124.
*SMPTE Journal*, vol. 30(3), Mar., 1981, "Research and Development . . . ", by K. Kayashi, pp. 178–186.
*BSTJ*, vol. 60(5), May–Jun., 1981, "Time-Frequency Multiplexing (TFM) . . . ", by B. G. Haskell, pp. 643–660.
*IEEE Trans. on Comm.*, vol. COM-29(12), Dec., 1981, "Time Compression Multiplexing . . . ", by K. Y. Eng et al, pp. 1832–1840.

*Primary Examiner*—John C. Martin
*Assistant Examiner*—Michael D. Dunnan
*Attorney, Agent, or Firm*—Erwin W. Pfeifle

[57] ABSTRACT

The present invention relates to a technique for generating a Semi-Compatible High Definition Television (SC-HDTV) signal which can be sent over two present-day Cable Television (CATV) channels. In accordance with the present invention, a HDTV signal is formed comprising a line scan rate which is a multiple of the line scan rate of a current conventional TV signal. The SC-HDTV signal is formed therefrom by transmitting a first HDTV line as is and a second HDTV line as a field differential signal transmitted via QAM on the IF or RF carrier of the first line signal at a line scan rate of a current conventional TV signal. Arrangements are also disclosed frDconverting the SC-HDTV signal back into eigher a HDTV or conventional TV signal.

14 Claims, 10 Drawing Figures

TECHNIQUE FOR GENERATING SEMI-COMPATIBLE HIGH DEFINITION TELEVISION SIGNALS FOR TRANSMISSION OVER TWO CABLE TV CHANNELS

BACKGROUND OF THE INVENTION

1. Technical Field

The present invention relates to a method and apparatus for generating a Semi-compatible high definition television (SC-HDTV) signal which can be transmitted within the bandwidth of two Cable TV (CATV) channels. More particularly, a HDTV signal is formed at twice the line-scan rate of a conventional TV signal and a SC-HDTV signal is formed therefrom by transmitting a first HDTV line signal as is and a second HDTV line signal has a field differential signal quadrature amplitude modulated (QAM) on the IF or RF carrier of the first line signal.

2. Description of the Prior Art

Present day conventional television using, for example, NTSC or PAL system signals provide fairly good color pictures if the receiving conditions are good. Such pictures, however, do not come close to having the sharpness, realism and visual impact as might be found, for example, in a motion picture film or a magazine quality picture. To provide dramatically better television picture quality, experimental studies have been performed and components have been developed in an attempt to provide High-Definition Television (HDTV) pictures which approach the quality of a 35 mm color film. Such high resolution TV has been deemed especially advantageous for use, for example, in wide screen theater and home TV projection and for theatrical motion picture production and projection using magnetic tape instead of film.

Several HDTV systems have already been proposed, the parameters of which are generally disclosed in the article "The Future of High-Definition Television: First Portion of a Report of the SMPTE Study on High-Definition Television" by D. G. Fink in *SMPTE Journal*, Vol. 89, No. 2, February 1980 at pp. 89-94 and its conclusion in Vol. 89, No. 3, March 1980 at pp. 153-161. In the systems disclosed therein, the lines per frame range from 1023 to 2125, the aspect ratios (picture width to picture height) range from 4:3 to 8:3 and luminance bandwidths range from 20 to 50 MHz. The recommendation of this group was that a HDTV signal should be capable of a standards conversion that would provide service to NTSC, PAL and SECAM domestic services. After three years of study, however, this group concluded that a HDTV system compatible with the existing domestic services is not feasible by any means known to or envisaged by the Study Group, in view of HDTV aspect ratios and bandwidths. They further concluded that adoption of a non-compatible HDTV system for home use is problematical and would occur only after prolonged exposure to the public of HDTV projected images in theaters.

A description of one of the systems considered by the SMPTE Study Group is found in the articles "High-Definition Television System-Signal Standard and Transmission" by T. Fujio et al in *SMPTE Journal*, Vol. 89, No. 8, August 1980 at pp. 579-584 and "Research and Development on High-Definition Television in Japan" by K. Hayashi in *SMPTE Journal*, Vol. 90, No. 3, March 1981 at pp. 178-186. These articles discuss the 1125 scan line, 5:3 aspect ratio, 20 MHz luminance bandwidth system being developed in Japan. Compatibility with conventional receivers is not discussed or considered.

Other techniques labeled as either high-definition or high-resolution television system have modified the transmission of the conventional TV signal to, for example, provide increased horizontal line resolution or better luminance resolution with less objectionable subcarrier pattern. In this regard see, for example, U.S. Pat. No. 2,686,831 issued to R. B. Dome on Aug. 17, 1954 where large area flicker is allegedly canceled by subdividing the TV picture signal into three contiguous bands and transmitting each of the three bands in a certain manner during the normal sequence of a conventional picture signal. See also U.S. Pat. No. 4,296,431 issued to K. F. Holland on Oct. 20, 1981, wherein the picture signal has one of the color axes inverted at a first rate while the second color axis is inverted at a second, different, rate to provide better luminance resolution and better subcarrier pattern than allegedly found with the normal conventional signal.

Another technique for improving the horizontal and vertical definition and reducing low frequency flicker in a conventional picture is disclosed in the article "Concepts For A Compatible HIFI-Television System" by B. Wendland in *NTG-Fachber* (Germany), Vol. 74, September, 1980, at pp. 407-416. There is disclosed an arrangement wherein the picture quality can allegedly be improved using digital signal processing technologies. Offset sampling is used to improve horizontal definition, and a double rate stored image readout at the receiver selects the appropriate signal portions to subjectively increase the vertical definition and reduce low frequency (25 Hz) flicker. The latter three references, however, are only attempts to improve conventional television receiver picture quality and do not provide resolution comparable to a 35 mm film or magazine quality picture.

U.S. patent Appln. Ser. No. 391,973 filed for B. G. Haskell on June 24, 1982 provides a technique for generating a television signal which is capable of being converted into either a HDTV picture signal or a conventional standard picture signal for use in present day receivers. More particularly, a compatible HDTV is generated by transforming a HDTV picture signal at a first line scan rate into a color picture signal at a second line rate corresponding to the conventional TV line rate by (a) stretching each of at least two line signals by a predetermined factor, (b) forming a first line signal of at least two time stretched lines for transmission as is, and (c) forming a second line signal of the at least two time stretched lines as a line differential signal for transmission in a second portion of the compatible HDTV picture signal on a vestigial sideband carrier signal which is separated from the color subcarrier of the associated conventional TV picture signal. Such compatible HDTV signal, however, requires approximately 15–16 MHz of bandwidth for transmission and can be sent on two C-band satellite transponders or one wider $K_u$-band satellite transponder or three present-day Cable Television (CATV) channels for local distribution.

The problem remaining in the prior art is to provide a semi-compatible HDTV picture signal which can be transmitted within the bandwidth of two CATV channels and can be converted to either a HDTV or conventional TV signal at the subscriber's receiver to make HDTV transmission reasonable for Cable TV operators.

SUMMARY OF THE INVENTION

The foregoing problem in the prior art has been solved in accordance with the present invention which relates to a method and apparatus for generating a semi-compatible high definition television (SC-HDTV) signal which can be transmitted within the bandwidth of two CATV channels. More particularly, a HDTV signal is formed at twice the line scan rate of a conventional TV signal and a SC-HDTV signal is formed therefrom by transmitting a first HDTV line signal as is and a second HDTV line signal as a field differential signal quadrature amplitude modulated (QAM) on the IF or RF carrier of the first line signal.

Other and further aspects of the present invention will become apparent during the course of the following description and by reference to the accompanying drawings.

BRIEF DESCRIPTION OF THE DRAWINGS

Referring now to the drawings, in which like numerals represent like parts in the several views.

DETAILED DESCRIPTION

Figure 1:
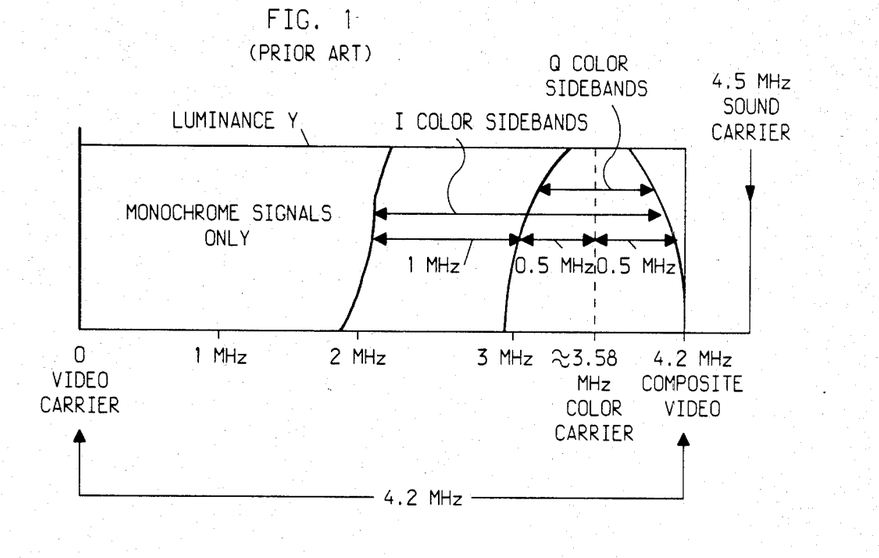
FIG. 1 illustrates the frequency spectrum for a National Television System Committee (NTSC) system baseband signal.

FIG. 1 illustrates a National Television System Committee (NTSC) signal which has a usable baseband spectrum that extends from 0 to 4.5 MHz between the 0 MHz video carrier and the 4.5 MHz sound carrier. The signal comprises a luminance signal (Y) formed over a 4.2 MHz band to provide the monochrome picture information relating to the picture component brightness, and chrominance signal information comprising I and Q chrominance components which are frequency interleaved with the luminance signal about a 3.579545 MHz color subcarrier to provide the color information. The picture signal provides 525 lines/frame interlaced two to one, an aspect ratio of 4:3, a horizontal scanning frequency $f_H$ approximately equal to 15,734 Hz for color. Such a signal is well known in the art and is provided here for reference purposes.

The following description is directed to providing a semi-compatible High Definition Television (SC-HDTV) picture signal in accordance with the present invention which is capable of being transmitting in a 12 MHz band. It is to be understood that the present invention could also be appropriately used for generating a SC-HDTV signal which could be used with other conventional standard TV picture signals such as, for example, PAL and SECAM picture signals, by performing appropriate modification of, for example, scan rates, etc.

In accordance with a preferred embodiment of the present invention, for HDTV camera scanning there is used, for simplicity of explanation only and not for purposes of limitation, 1050 lines per frame which is twice that of NTSC, 2:1 interlace and a line-scan rate $F_H$ exactly twice that of NTSC, i.e., approximately 31468 Hz. The frame and field rates are exactly the same as NTSC, and the luminance bandwidth, $B_Y$, is chosen to be 16 MHz. With such luminance bandwidth, the color subcarrier frequency $F_c$ is chosen to be approximately 14.05 MHz which is an odd multiple (893) of half the line rate $F_H$, thus allowing the well known luminance-chrominance interleaving in the composite signal.

The bandwidths of the I and Q chrominance components are taken to be, respectively, $B_I=5.7$ MHz and $B_Q=1.95$ MHz, which are about the same in proportion to $B_Y$ as they are in NTSC. If an overall HDTV aspect ratio (picture width to picture height) of 4.7:3 is achieved, then the bandwidth $B_Y$ corresponds to a Kell factor (ratio of horizontal to vertical resolution) of approximately 0.59, which is somewhat less than might be desired since the NTSC Kell factor=0.66. However, the Kell factor can and should be increased by spatio-temporal and comb filtering. This also has the side benefit of reducing vertical aliasing in the display, which is due to raster scanning.

Figure 2:
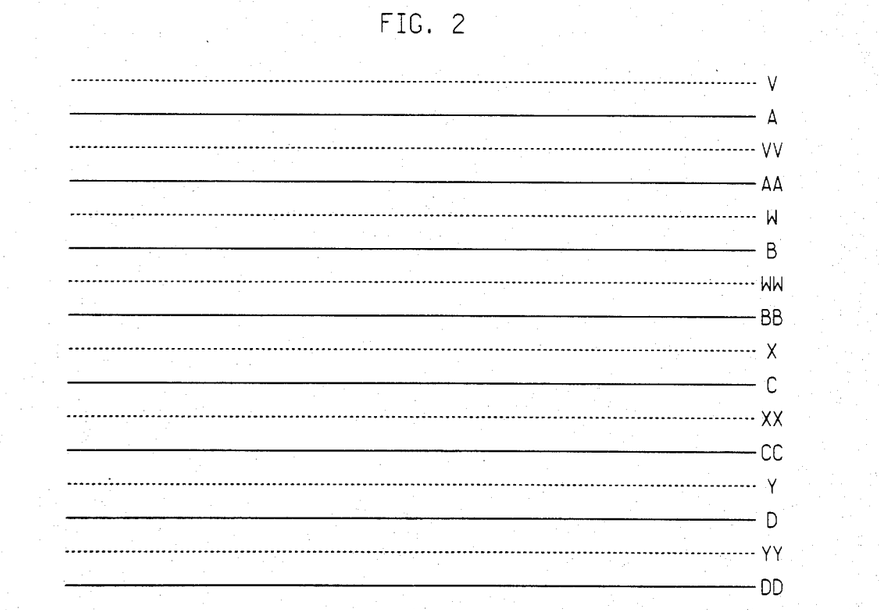
FIG. 2 illustrates successive scan lines from a complete interlaced frame of high definition television (HDTV) where the solid lines are from one field and the dashed lines are from the other field.
Figure 3:
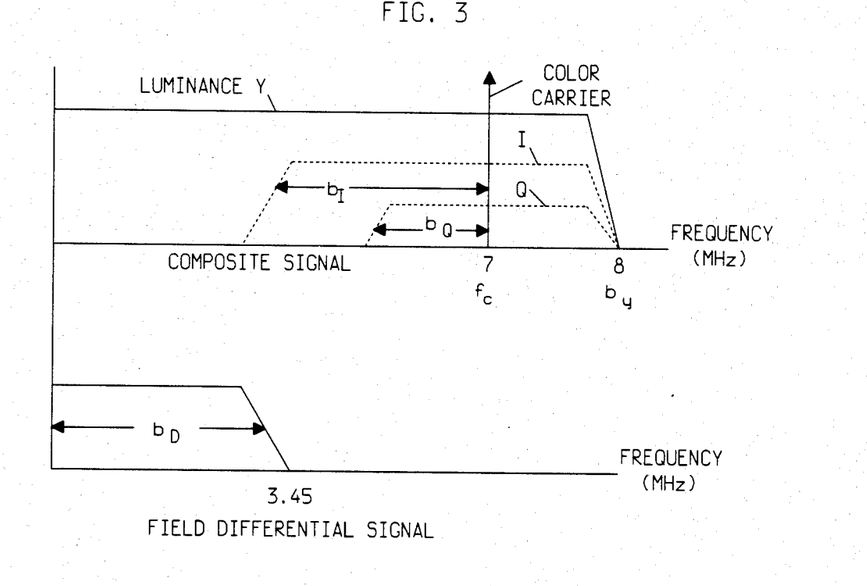
FIG. 3 illustrates the time expanded HDTV composite and field differential baseband signals in accordance with the present invention.

FIG. 2 shows several successive HDTV scan lines from one frame. The solid lines are from one field and the dashed lines are from the other field. In accordance with the present invention, each scan line is to be time-expanded by a factor of two so that the resulting durations are the same as the NTSC scan lines. Alternate lines of each field are then sent as is, while the intervening lines are sent in differential form. That is, lines A, B, C, . . . and lines V, W, X, . . . of FIG. 2 are sent as is, while lines AA, BB, CC, . . . and lines VV, WW, XX, . . . are sent in differential form. For example, using field-differentials, line AA would be sent as AA-W and line WW would be sent as WW-B. In all cases the field-differential signals are bandlimited to $B_D=0.43$ $B_Y$. When the HDTV scan lines are time expanded, the frequencies hereinbefore described are halved. Indicating such halving by lower case letter, then $f_H \sim 15734$ Hz $$b_Y = 8 \text{ MHz}$$
$$f_c \sim 7.02 \text{ MHz}$$
$$b_I = 2.85 \text{ MHz}$$
$$b_Q = 0.98 \text{ MHz}$$
$$b_D = 3.45 \text{ MHz} \tag{1}$$

where $f_H$ is exactly the line scan frequency of NTSC, and as was stated hereinbefore, the field-differential signal is bandlimited to 43 percent of the luminance bandwidth $b_Y$. This bandwidth precludes the transmission of chrominance for those lines which are sent in differential form, thus reducing the potential vertical chrominance resolution by a factor of two. However, the result is still considerably larger than the horizontal chrominance resolution, and the effect is not noticeable in normal pictures. With spatio-temporal and comb filtering the effect of this bandlimiting is reduced even further. The baseband spectra of the time-expanded composite and field differential signals are shown in FIG. 3.

Figure 4:
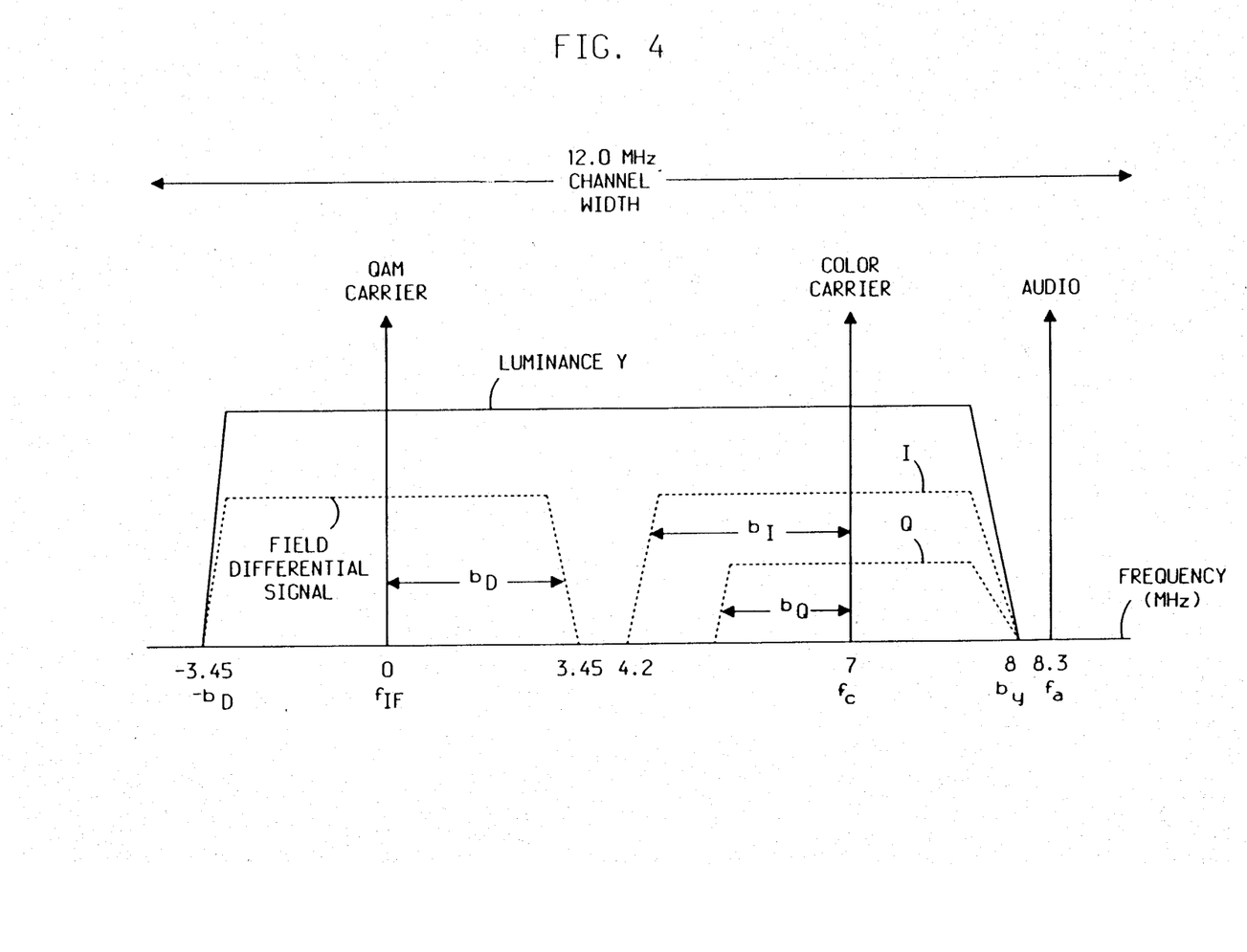
FIG. 4 illustrates the frequency spectrum for a semi-compatible (SC) HDTV signal in accordance with the present invention which includes a total bandwidth of 12 MHz.

For Cable television (CATV) systems having sufficient linearity, the field differential signal of FIG. 3 can be sent via Quadrature Amplitude Modulation (QAM) on the intermediate frequency (IF) or radio frequency (RF) carrier as shown in FIG. 4. In this case, the total bandwidth is approximately 12 MHz, i.e., two present day NTSC CATV channels. This signal may also be suitable for UHF or VHF over-the-air broadcast, but it is possible that the service area may be limited and that multipath may cause serious signal distortion.

Figure 5:
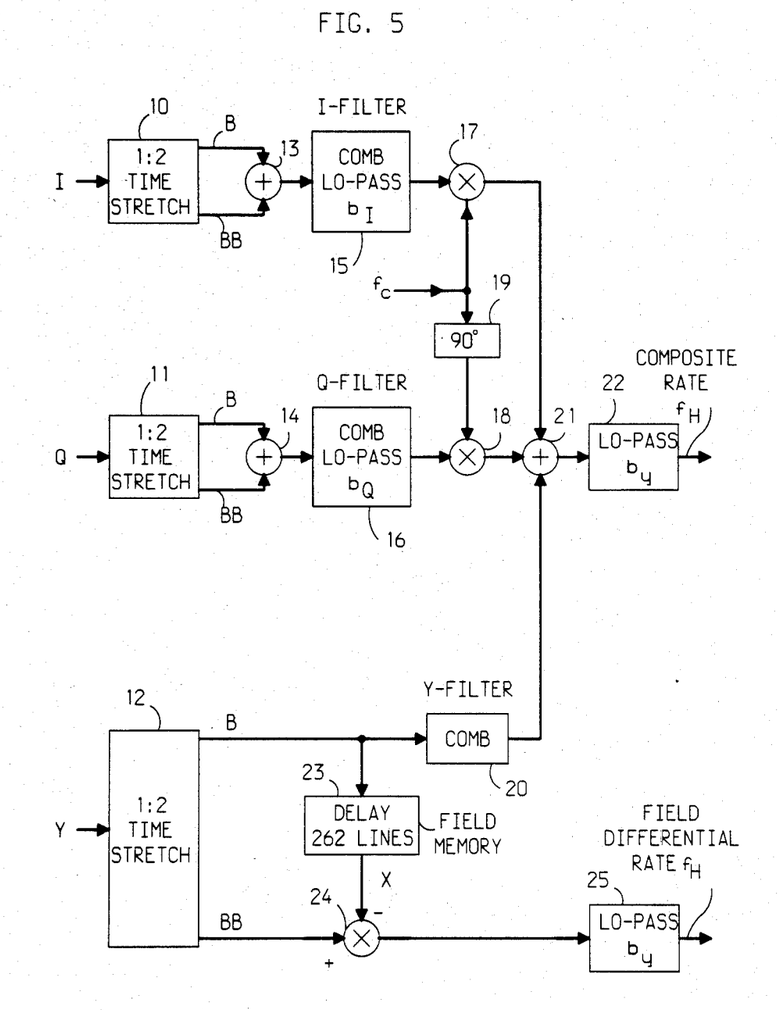
FIG. 5 illustrates a block diagram of an exemplary arrangement for converting HDTV luminance and chrominance signals into a time-stretched HDTV composite and field differential signal as shown in FIG. 3 in accordance with the present invention.

A block diagram of an arrangement for converting from the HDTV luminance, Y, and chrominance, I and Q, component signals, having scan rates and bandwidths given hereinbefore as $F_H$, $B_Y$, $F_c$, $B_I$ and $B_Q$, to the time-expanded composite and differential signals having scan rates and bandwidths given in Equation (1) and spectra as shown in FIG. 3, is shown in FIG. 5. First the HDTV scan lines occurring at rate $F_H$ are time-stretched by a factor of two. This is done for each of the I, Q and Y components by 1:2 Time Stretch devices 10, 11 and 12 respectively, which take the rate $F_H$ lines sequentially, two at a time, and output rate $f_H$ ($= F_H/2$) lines in parallel, two at a time. The time stretch devices are shown outputting the lines B and BB of FIG. 2.

The two outputs of each of the chrominance time stretch devices 10 and 11 are added together in adders 13 and 14, respectively, as a first step in reducing the vertical chrominance resolution. Following this, the chrominance signals I and Q are comb and lowpass filtered in filters 15 and 16, respectively, in order to reduce the vertical and horizontal resolution to their final values. For maximum picture quality, the chrominance comb filters should contain field memories so that several vertically adjacent lines may be averaged together. After comb filtering, the chrominance signals are quadrature modulated onto the color subcarrier $f_c$ using mixers 17 and 18 and phase shifting device 19. Mixer 17 mixes the output from filter 15 with the color subcarrier, while mixer 18 mixes the output from filter 16 with the color subcarrier frequency which has been phase shifted by 90 degrees in phase shifter 19.

Figure 6:
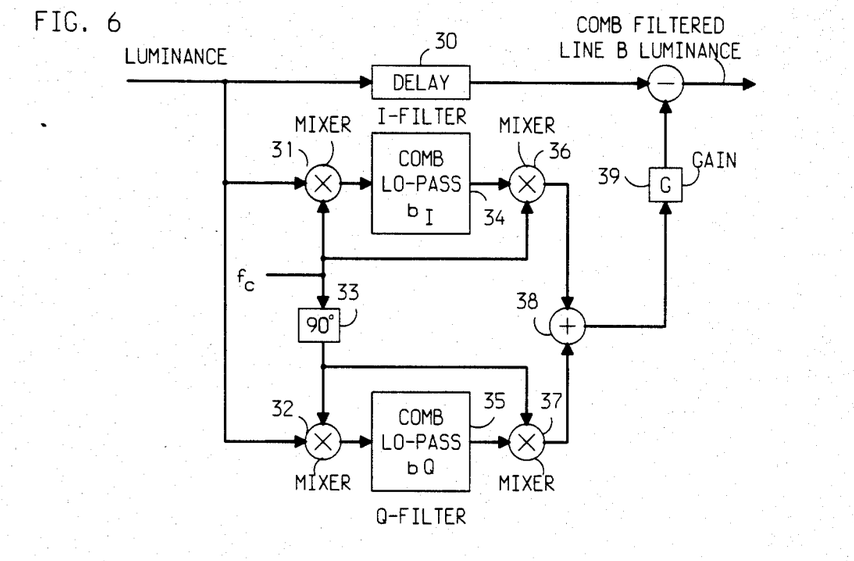
FIG. 6 illustrates a block diagram for an exemplary luminance comb filter for use in the arrangement of FIG. 5.

In order to minimize luminance-chrominance crosstalk, the luminance portion of the composite line (line B) must also be comb filtered in filter 20. An exemplary optimum Y filter 20 is shown in FIG. 6. There, the luminance portion of line B is inputted to a delay means 30 and a first and second mixer 31 and 32. Mixers 31 and 32 use the color subcarrier frequency $f_c$ and a 90 degree phase shifter 33 to form in-phase and quadrature components, respectively, of the signal of line B. The in-phase and quadrature signals from mixers 31 and 32 are comb and low-pass filtered in filters 34 and 35, respectively. The output signals from filters 34 and 35 are mixed in mixers 36 and 37 with corresponding components of the color subcarrier as used by mixers 31 and 32, respectively. The outputs from mixers 36 and 37 are added in adder 38, and the resultant signal is amplified in an amplifier 39 with a predetermined gain G. The amplified output signal from amplifier 39 is then subtracted from the delayed output from delay means 30 to provide a comb filtered luminance signal of line B. Crosstalk is generally eliminated with unity gain G in amplifier 39. However, slightly better picture quality may result if $G < 1$. In this case luminance vertical resolution is increased somewhat at the expense of some luminance-chrominance crosstalk, which should not be visible very often. The best value for G can only be determined by subjective test. It is to be understood that other suitable filter arrangements could be used for the arrangement of FIG. 6.

Returning to FIG. 5, the comb filtered luminance (line B) is then added in adder 21 to the QAM chrominance components and the result bandlimited to $b_Y$ in low-pass filter 22 to form the composite rate $f_H$ signal. The field differential signal is formed simply by delaying the line B luminance, for example, for 262 line periods, in a field memory 23 and obtaining the previously stored line X at the output of memory 23 in FIG. 5. The delayed luminance signal (line X) is then subtracted in subtracter 24 from the luminance signal of line BB and bandlimited in low-pass filter 25 to $b_D$, which yields the desired rate $f_H$ field-differential signal. The overall picture quality may be enhanced by spatio-temporal filtering, sometimes called anti-aliasing filtering, of the Y, I and Q components prior to time-stretching and construction of the composite and differential signals. This is especially true of electronically generated graphical material which, due to interlace, often suffers from interline flicker at sharp vertical transitions.

Figure 7:
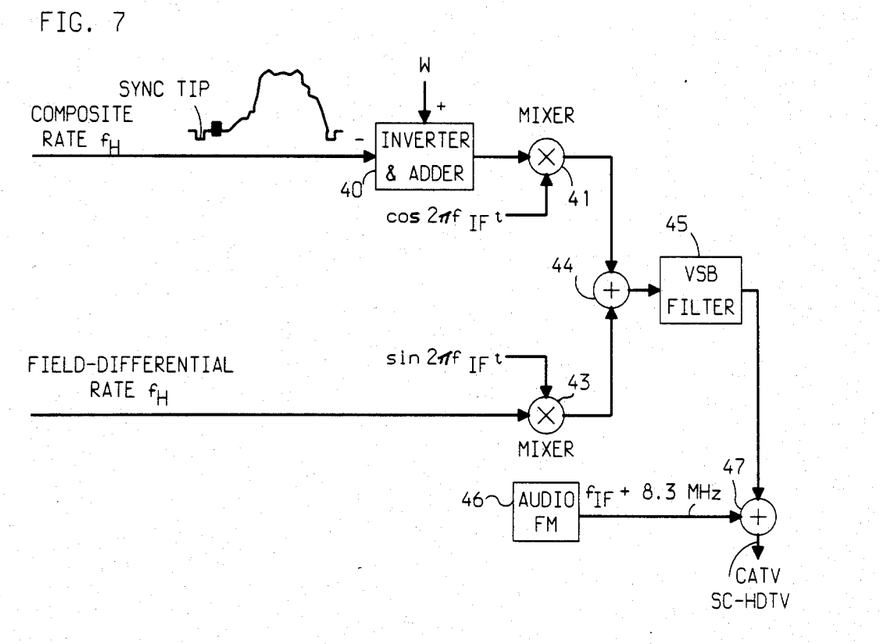
FIG. 7 illustrates a block diagram for an exemplary modulator for generating a SC-HDTV signal, in accordance with the present invention, from the time-stretched composite and field differential output signals from FIG. 5.
Figure 8:
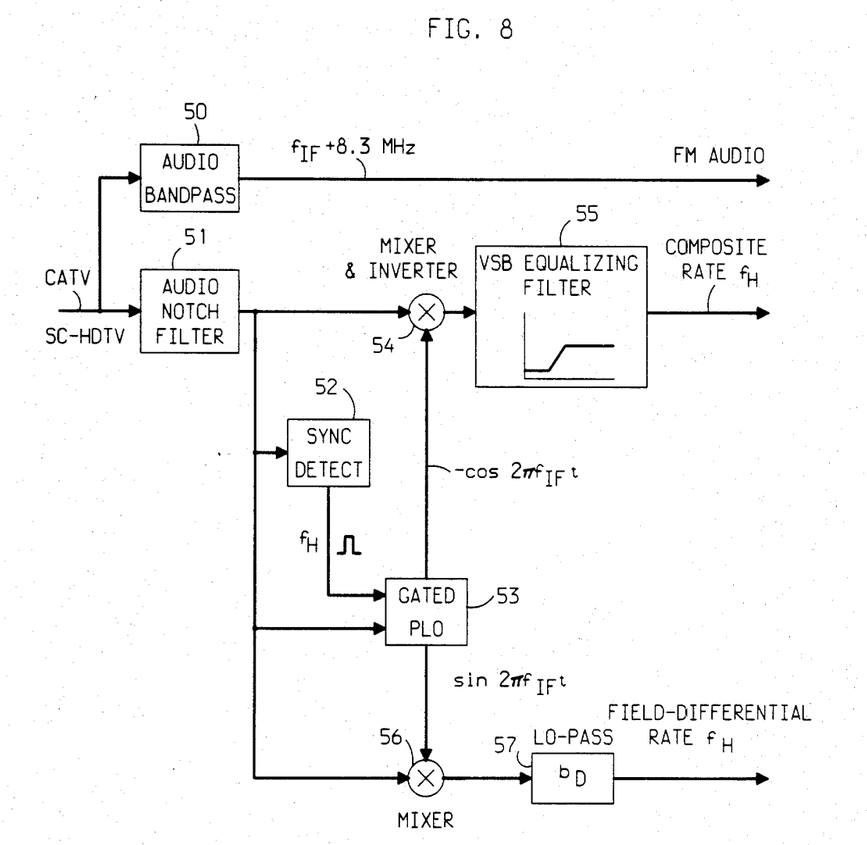
FIG. 8 illustrates a block diagram of an exemplary demodulator for demodulating the output SC-HDTV output signal from FIG. 7 into the time-stretched composite and field differential signals.

For CATV and other transmission systems having sufficient linearity, the composite and field-differential signals at the output of FIG. 5 can be sent on a single RF carrier via QAM as shown in the spectrum of FIG. 4. The modem for accomplishing this is shown in FIGS. 7 and 8. In the modulator section shown in FIG. 7, the composite video signal is first inverted and a carrier component of amplitude W added in inverter and adder 40 and then mixed in mixer 41 with an in-phase carrier. The carrier component of amplitude W is added so that the maximum peak-to-peak excursion of the modulated carrier occurs at the tips of the horizontal sync pulses, where the field-differential signal is zero.

The field-differential signal from FIG. 5 is mixed in mixer 43 with a quadrature carrier signal and the resultant signal is added in adder 44 to the output signal from mixer 41. The resulting QAM signal at the output of adder 44 is then applied to a vestigial Sideband (VSB) filter 45 which removes part of the lower sideband in order to produce the video spectrum of FIG. 4. Since the VSB filter 45 does not affect the sidebands of the field-differential signal, this filter could also be placed directly after mixer 41. Audio FM from source 46 is then added in adder 47 to produce the final CATV SC-HDTV signal for transmission over the appropriate channel.

A demodulator for appropriately demodulating the resultant CATV SC-HDTV output signal from FIG. 7 is shown in FIG. 8. The first step is to separate the audio and video signals by means of an Audio Bandpass filter 50 and an Audio Notch Filter 51, respectively. The video signal from Notch filter 51 is transmitted to a Sync Detector 52 and a Gated Phase Locked Oscillator PLO 53. Sync Detector 52 functions to produce a horizontal sync pulse for use by Gated PLO 53. If the carrier component W is sufficiently large, then sync detection may consist of a simple diode/capacitor AM demodulator followed by a peak signal detector. Otherwise, a more complicated circuit such as a phase locked loop operating at rate $f_H$ may be required.

The gated PLO 53 produces in-phase and quadrature carriers required for QAM demodulation. This operation is fairly straightforward since during the horizontal sync pulse, the QAM video is simply a constant amplitude in-phase carrier signal which can be used as a reference. Phase shifts of 90 degrees and 180 degrees then produce sine and cosine carrier components, respectively. A mixter 54 demodulates and re-inverts the composite signal which then passes to an equalizing filter 55 which compensates for the VSB filtering (filter 45) of FIG. 7. The VSB equalization could also be performed (a) at IF prior to mixer 54, (b) prior to, or directly following, mixer and inverter 41 in FIG. 7, or (c) in combination with the VSB filter 45 of FIG. 7. A mixer 56 demodulates the field-differential signal which then passes to a low-pass filter 57 in order to remove any out-of-band components.

Figure 9:
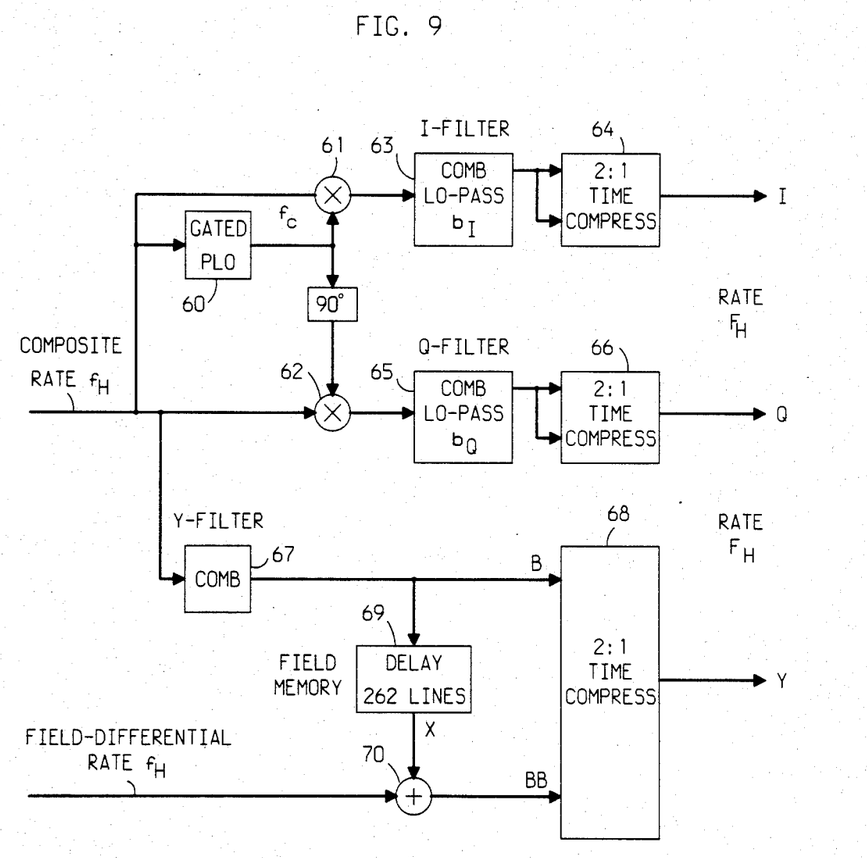
FIG. 9 illustrates a block diagram of an arrangement for converting the time-stretched output signals from FIG. 8 into a HDTV signal originally found at the input to the arrangement of FIG. 5.

FIG. 9 is a block diagram of an arrangement for conversion from the time-expanded signal at the output of FIG. 8 back to the HDTV signal originally found at the input of FIG. 5. There, the composite input signal is received by a gated PLO 60 which functions to generate the color carrier $f_c$. An in-phase and quadrature carrier signal is mixed in Mixers 61 and 62, respectively, with the composite input signal to generate the respective I and Q chrominance components. The output from mixer 61 is filtered in comb and low-pass filter 63 and time compressed in time compressor 64 to generate the I chrominance signal at rate $F_H$. The output from mixer 62 is filtered in comb and low-pass filter 65 and time compressed in time compressor 66 to generate the Q chrominance signal at rate $F_H$.

The composite signal at rate $f_H$ is also passed through a luminance comb filter 67 and transmitted to both a time compressor 68 and a field memory 69. Field memory 69 functions as described for field memory 23 of FIG. 5 to delay the line B information and concurrently product the line X information at its output when receiving the line B information. The line X information is added in adder 70 with the received field-differential signal at rate $f_H$ to generate the line BB information. The line B and BB information is time compressed in time compressor 68 in an inverse manner to the process of time stretcher 12 of FIG. 5 to take the parallel inputs and generate a single output signal of lines B and BB at the $F_H$ rate.

With digital, or at least time discrete, implementation, most of the operations are fairly straightforward. If the sampling rate is $4f_c$, then the mixing operations are simple multiplications by 0, +1 or −1. The time compressors 64 and 66 are easily realized with a few kilopixels of memory, and the field memory 69 requires about 468 kilopixels of memory. The field memory size can be lowered by reducing the luminance sampling rate following the Y-filter 67, and also by not storing the picture elements corresponding to horizontal and vertical blanking. Assuming a sampling rate reduction by 3/5, 8 percent horizontal blanking and 5 percent vertical blanking, the size of field memory 69 becomes approximately 245 kilopixels. The Y-filter 67 can have the form shown in FIG. 6 and, if such form is used, then implementation may be simplified since the output signals from the I and Q filters 34, 63 and 35, 65, respectively, in FIGS. 6 and 9 are the same. Thus, mixers 36 and 37, as well as the I and Q filters 34 and 35 of FIG. 6, need not be implemented since theor output signals are already available at the outputs of the I and Q filters 63 and 65 of FIG. 9.

Figure 10:
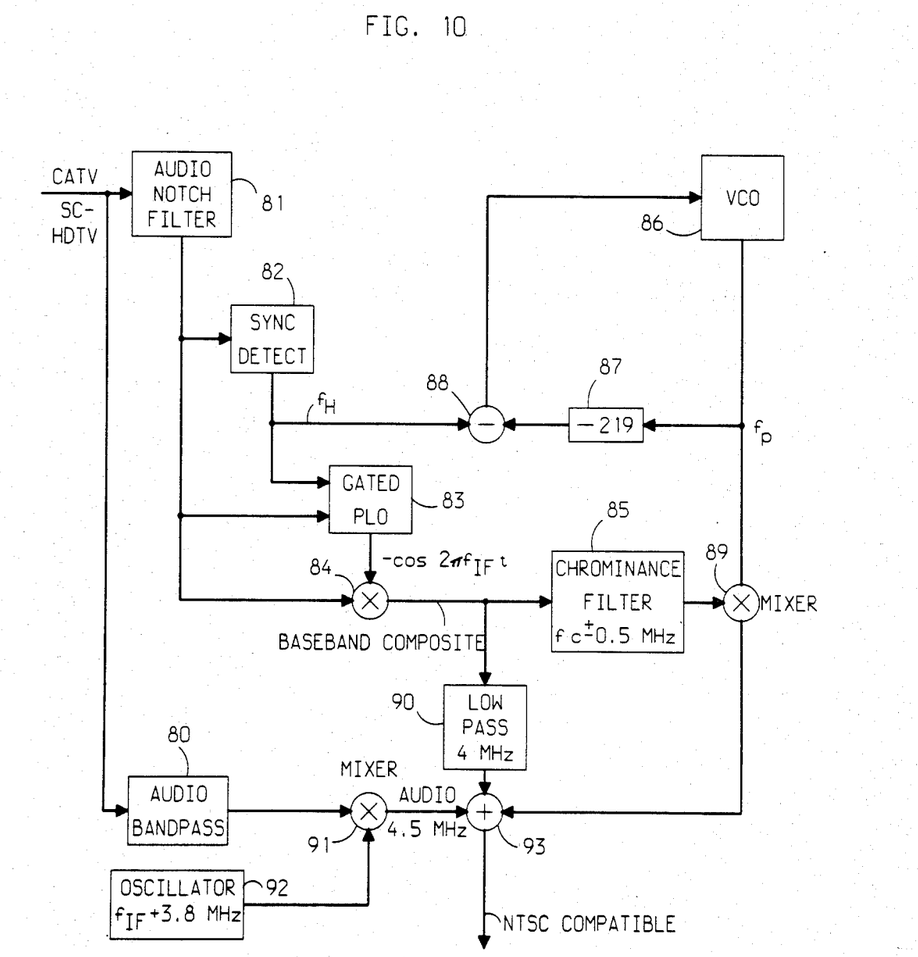
FIG. 10 illustrates a block diagram of an arrangement for converting a SC-HDTV signal as shown in FIG. 4 into an NTSC compatible video signal.

FIG. 10 illustrates a block diagram of an arrangement for converting from a CATV SC-HDTV signal, as shown in FIG. 4, into an NTSC compatible video signal. Essentially, the composite video portion of the SC-HDTV waveform is recovered, after which the chrominance is extracted and moved to its proper NTSC location. More particularly, the SC-HDTV signal is passed through an audio bandpass filter 80, to retrieve the audio signal at its output, and an audio notch filter 81 to retrieve the video signal. The video signal at the output of filter 81 is applied to a sync detector 82, a gated PLO 83 and a mixer 84 to extract the composite video signal in exactly the same manner as shown in FIG. 8 for elements 52-54. Following this the chrominance is extracted by a bandpass filter 85 centered about $f_c$. For optimum picture quality, the chrominance filter 85 should contain a comb filter to remove luminance components in the 1 MHz band centered at $f_c$. However, for most pictures the improvement will be slight, and, therefore, comb filtering may not be worth the extra cost.

A Voltage Controlled Oscillator (VCO) 86 produces a frequency $f_p$ which approximates $219F_H$ ($f_c$-3579545 Hz) by means of a phase locked loop comprising a divide by 219 circuit 87 and a subtracter 88. The chrominance signal at the output of filter 85 and the frequency, $f_p$, from VCO 86 are mixed in mixer 89 in order to move the chrominance down to the NTSC color subcarrier frequency of 3579545 Hz. The composite signal is then low-pass filtered by a luminance filter 90, and the FM audio signal is moved to its NTSC location of 4.5 MHz by mixer 91 using the output from an oscillator 92. The audio, luminance and chrominance signals at the outputs of mixer 91, filter 90 and mixer 89, respectively, are then added in adder 93 to form a compatible NTSC composite waveform.

What is claimed is:
1. An arrangement for generating a semi-compatible high-definition television (SC-HDTV) color picture signal including a predetermined bandwidth and format, the arrangement comprising:
 first generating means (10-12) responsive to line signals of a HDTV color picture signal including luminance and chrominance components received at a first line scan rate for generating therefrom stretched color picture signals which include line signals at a second line scan rate that is both a submultiple of the first line scan rate and at a same line scan rate as that of an associated conventional standard television system picture signal;

second generating means (15-25) responsive to a first and a second sequential line of a field of a stretched color picture signal at the output of the first generating means for generating therefrom a first output signal comprising the first line signal substantially as is, and a second output signal comprising the second line signal as a field differential signal; and modulating means (40–41, 43–47) responsive to the first and second output signals from the second generating means for quadrature amplitude modulating (QAM) the second output signal on the video carrier of the first output singal, said modulated second output signal being disposed to lie within a luminance bandwidth of, and outside a chrominance bandwidth of, the modulated first output signal such that the first line and field differential signals lie within said predetermined bandwidth of the SC-HDTV color picture signal.

2. An arrangement for generating a SC-HDTV color picture signal according to claim 1 wherein
the modulating means is further capable of modulating onto the modulated first and second output signals, an audio signal associated with the SC-HDTV color picture signal which is outside a bandwidth of the luminance component of the modulated first output signal and within said predetermined bandwidth of the SC-HDTV color picture signal.

3. An arrangement for generating a SC-HDTV color picture signal according to claim 1 wherein
the first generating means comprises time stretching means capable of receiving the luminance and chrominance components of the first and a second line signals of the HDTV color picture signal in sequence at the first line scan rate and generating the luminance and chrominance components of the first and second line signal for transmission along separate paths at the second line scan rate of the SC-HDTV color picture signal.

4. An arrangement for generating a SC-HDTV color picture signal according to claim 3 wherein
the second generating means is responsive to the output from said time stretching means and comprises:

means (13–16) for separately averaging corresponding first and second chrominance components of one or more adjacent time stretched line signals and reducing a resultant vertical and horizontal chrominance resolution to a predetermined value for transmission in a first and second chrominance component averaged output signal of the averaging means;

means (17–19), responsive to output signals from the averaging means, for modulating the first chrominance component averaged signal with a color subcarrier of the time stretched first line signal, and modulating the second chrominance component averaged signal with a quadrature component of said color subcarrier for generating first and second output signals, respectively, representative of such modulation;

means (21) for adding the luminance component of the first line signal and the output signal from the modulating means of the second generating means for producing a composite output signal representative of the time stretched first line signal forming the first output signal of the second generating means; and means (23, 24), responsive to the time stretched luminance component signals of the first and second line signals, for delaying the first line signal for approximately a field period and combining the second line signal with a delayed first line signal for generating a field differential signal forming the second output signal of the second generating means.

5. An arrangement for generating a SC-HDTV color picture signal according to claim 1 wherein said predetermined bandwidth comprises the bandwidth of two conventional standard cable television channels.

6. A receiver for converting a semi-compatible high-definition television (SC-HDTV) color picture signal into a picture signal for use by a HDTV display device, the received SC-HDTV color picture signal comprising (a) a predetermined bandwidth, (b) a line scan rate which is the same as that of an associated conventional standard television system color picture signal, (c) a composite signal which is formed of a first SC-HDTV line signal and is received substantially as is within said predetermined bandwidth, and (d) a field differential signal, which is received concurrent with the composite signal, quadrature amplitude modulated (QAM) on a video carrier on the composite signal and within said predetermined bandwidth, the receiver comprising:

means (51–57), responsive to a received SC-HDTV color picture signal, for demodulating to baseband and separating the composite signal and the field differential signal for transmission over separate paths;

means (60-63, 65, 67, 69), responsive to the composite and field differential signals from the demodulating and separating means, for transforming the field differential signal into a second SC-HDTV line signal, which is an adjacent line of the first SC-HDTV line signal in a field, and for generating separate luminance and chrominance component output signals associated with each of the first and second SC-HDTV line signals; and time compression means (64, 66, 68), responsive to the corresponding luminance and chrominance output signals associated with the first and second SC-HDTV line signals concurrently received from the transforming means at the SC-HDTV color picture signal line scan rate, for generating separate first and second HDTV color picture line signals in sequence at a line scan rate which is a predetermined multiple of the SC-HDTV color picture line scan rate.

7. A receiver according to claim 6 wherein the transforming means comprises:

means (69) for receiving and delaying each composite signal for approximately one SC-HDTV field period and generating as an output signal therefrom the SC-HDTV line signal previously received approximately one field period earlier; and adding means (70) for adding together the received field differential signal and the field delayed composite output signal from the receiving and delaying means for generating said second SC-HDTV line signal.

8. A receiver according to claim 6 wherein the predetermined multiple of the SC-HDTV color picture line scan rate is equal to 2.

9. A receiver for converting a semi-compatible high-definition television (SC-HDTV) color picture signal into an associated conventional standard television system color picture signal, the received SC-HDTV color picture signal comprising (a) a predetermined bandwidth, (b) a line scan rate which is the same as that of the associated conventional standard television system picture signal, (c) a composite signal which is formed of a first SC-HDTV line signal and is received substantially as is within said predetermined bandwidth, and (d) a field differential signal, which is received concurrent with the composite signal, quadrature amplitude modulated (QAM) on a video carrier of the composite signal and within said predetermined bandwidth, the receiver comprising:

means (81–84), responsive to a received SC-HDTV color picture signal, for generating therefrom an output signal comprising only the composite signal in the baseband frequency spectrum;

means (85, 90), responsive to the output signal from said generating means, for separating luminance and chrominance components of the composite input signal;

means (86–89) for disposing the chrominance component at the output of said separating means within the frequency band of the chrominance component found within the baseband conventional standard television system color picture signal; and means (93) for adding the luminance component at the output of said separating means and the chrominance component at the output of said disposing means to generating an output signal corresponding to the baseband signal of the conventional standard television system color picture signal.

10. A receiver according to claim 9 wherein the disposing means comprises an oscillator which is locked in the line scan rate of the SC-HDTV picture signal for producing an output frequency which is a predetermined multiple of said line scan rate; and modulating means for mixing the output chrominance component signal of the separating means with the output frequency of said oscillator for disposing said chrominance component signal within the frequency band of the chrominance component found within the baseband conventional standard television system color picture signal.

11. A method of generating a semi-compatible high-definition television (SC-HDTV) color picture signal including a predetermined bandwidth and format, the method comprising the steps of:

(a) receiving sequential line signals associated with fields of a HDTV picture at a first line scan rate;

(b) stretching each of a first and a second sequential line signal receiving in step (a) in time by a factor which is an inverse of a predetermined submultiple of the first line scan rate for generating an output signal including the first and second line signals concurrently transmitted along separate paths at a second line scan rate which corresponds to a line scan rate of an associated conventional standard television system color picture signal;

(c) forming a first part of the SC-HDTV color picture signal by transmitting the time stretched first line signal from step (b) as is within the predetermined bandwidth of the SC-HDTV color picture signal; and (d) concurrent with step (c), forming a second part of the SC-HDTV color picture signal by generating a field differential signal of the time stretched second line signal from step (b) and quadrature amplitude modulating (QAM) the field diferential signal on a video carrier of the time stretched first line signal of step (d) and within the predetermined bandwidth of the SC-HDTV color picture signal.

12. A method of generating a SC-HDTV color picture signal according to claim 11 wherein the method comprises the further step of:

(e) concurrent with steps (c) and (d), transmitting an audio signal associated with the SC-HDTV color picture signal in a frequency band within the predetermined bandwidth of the SC-HDTV color picture signal and outside the frequency band of the first line signal transmitted in step (c).

13. A method of converting a semi-compatible high-definition television (SC-HDTV) color picture signal into a HDTV color picture signal for use by a HDTV receiver, the SC-HDTV color picture signal including a predetermined bandwidth wherein a first line signal is received as is at a first line scan rate and a second line signal, which is a line adjacent to the first line in a field of the picture signal, is received as a field differential signal quadrature amplitude modulated (QAM) onto a video carrier of the first line signal and at the first line scan rate, the first line scan rate corresponding to the line scan rate of a conventional standard television system picture signal, the method comprising the steps of:

(a) separating the first line signal and the field differential signal of the SC-HDTV color picture signal for transmission over separate paths;

(b) delaying each received first line signal from step (a) for a period of time corresponding substantially to a field period of the SC-HDTV color picture signal;

(c) adding a currently available delayed first line signal from step (b) to a currently received field differential signal in step (a) for generating an output signal corresponding to the second line signal of the SC-HDTV color picture signal; and (d) time compressing the first and second line signals from steps (a) and (c), respectively, received in parallel over separate paths at the first line scan rate into a first and a second line signal transmitted in sequence at a second line scan rate which is a predetermined multiple of the first line scan rate to produce the HDTV color picture signal.

14. A method of converting a semi-compatible high-definition television (SC-HDTV) color picture signal into an associated conventional standard television system color picture signal for use by a conventional system television receiver, the SC-HDTV color picture signal including a predetermined bandwidth wherein a first line signal is received as is at a first line scan rate, which corresponds to a line scan rate of the conventional standard television system color picture signal, and a second line signal, which is a line adjacent to the first line signal in a field of the SC-HDTV picture signal, is received as a field differential signal quadrature amplitude modulated (QAM) onto a video carrier of the first line signal and at the first line scan rate, the method comprising the steps of:

(a) extracting from the received SC-HDTV color picture signal only the first line signal and transmitting luminance and chrominance components thereof as a baseband output signal;

(b) shifting the chrominance component from step (a) to the color subcarrier frequency of the conventional standard television system baseband color picture signal;
(c) concurrent with step (b), filtering the output signal from step (a) to generate a luminance component of the first line signal which has a frequency band corresponding to the luminance frequency band of the conventional standard television system color picture signal; and
(d) adding the luminance and chrominance components of the first line signal from steps (c) and (b), respectively, for generating the conventional standard television system color picture signal.

* * * * *